United States Statutory Invention Registration [19]

[11] Reg. Number: H666

Milton [43] Published: Aug. 1, 1989

[54] CIRCUIT FOR MEASURING ABSOLUTE TIME LAPSE BETWEEN IMPACT AND DETONATION

[75] Inventor: Robert W. Milton, Huntsville, Al.

[73] Assignee: The United States of America as represented by the Secretary of the Army, Washington, D.C.

[21] Appl. No.: 309,759

[22] Filed: Feb. 13, 1989

[51] Int. Cl.[4] ..... G04F 8/00

[52] U.S. Cl. ..... 368/110

*Primary Examiner*—Thomas H. Tarcza
*Assistant Examiner*—Linda J. Wallace
*Attorney, Agent, or Firm*—Freddie M. Bush; Hay Kyung Chang

[57] ABSTRACT

Insulating material is used to attach a conducting foil patch to conductive surface of motor case. The patch is a part of an open electrical circuit, along with a power source, timer and connecting wires until impact which causes the patch to collapse and come in contact with the motor surface, thus closing the circuit. When the circuit is closed and voltage is present, the timer records the time of impact and continues to count. A piezo-electric pin attached to motor case and connected to the timer creates voltage pulse upon detonation of motor case and this pulse stops the timer. Thus, accurate measurements of time lapse between impact and detonation can be made.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CIRCUIT FOR MEASURING ABSOLUTE TIME LAPSE BETWEEN IMPACT AND DETONATION

DEDICATORY CLAUSE

The invention described herein may be manufactured, used, and licensed by or for the Government for governmental purposes without the payment to me of any royalties thereon.

BACKGROUND OF THE INVENTION

An impact test referred to as a bullet test is performed on various motor cases to ascertain the time lapse between impact of a bullet and explosion of the impacted motor case.

A bullet test involves shooting a bullet into a live piece of missile propellant encased in some type of material that simulates a motor case. The bullet strike may cause the motor case to detonate. The problem to be solved is measuring the absolute time lapse between the bullet impact and the motor explosion. A standard shock wave, upon emanating from the point of a bullet impact in missile propellant, is generally about 5 millimeters per microsecond. Therefore, the time lapse measurement must be at least in the microsecond range to be meaningful. This is an extremely accurate measurement and any inaccuracy in the data gathering devices will lead to a large, indeterminable error.

The main reason for timing errors that occur in conventional solutions is that most of the techniques involve the use of a shock sensing device to detect the impact of the bullet and then, the shock of the detonation. Methods like these do not give the required accuracy because of a fundamental flaw of the methods that is due to the speed of a vibration wave traveling through the motor casing. The sensing devices are usually placed several inches away from the expected point of impact for protection purposes. When the bullet strikes the motor case, a three dimensional shock wave emanates from the point of impact and travels through both the motor casing and the propellant itself. The wave travels at a finite velocity through the various materials and it takes a certain length of time for the shock waves to actually reach the impact sensing device where they can be recorded. It is very possible, given the fact that there is an appreciable time lag between the time when the bullet strikes the case and the time when the impact is recorded, that the propellant can react to the shock and detonate in less time than it takes for the initial shock wave of the bullet strike to reach the sensing devices. The data in such a situation would show that the motor detonated before the bullet impacted the case. In an experiment requiring high degrees of accuracy, it is immediately apparent that a simpler, much more accurate way of timing the span between bullet impact and motor detonation is required. The detonation properties of various propellants are revealed by such time lapse measurements. This knowledge may, in turn, be used to manufacture improved propellants.

SUMMARY OF THE INVENTION

A metallic foil patch is attached to the explosive-containing motor case via a pair of insulators which keep the foil patch from direct contact with the motor case surface until bullet strike. The foil is electrically connected to a power source which is, in turn, connected to a timer. Before the bullet strike, the electrical circuit is open and the timer is inactive. When a bullet strikes the foil patch and the patch collapses on the motor case surface, the circuit is closed and the timer records the exact time of impact and continues to count. A data acquisition pin attached to the motor case and connected to the timer creates voltage when the motor case detonates and this voltage stops the timer. Thus accurate measurements of time lapse between bullet strike and detonation may be made.

DESCRIPTION OF THE PREFERRED EMBODIMENT

Figure 1:
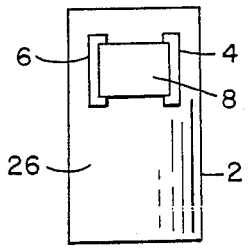
FIG. 1 is a diagram of the front view of the switch assembly for the circuit.
Figure 2:
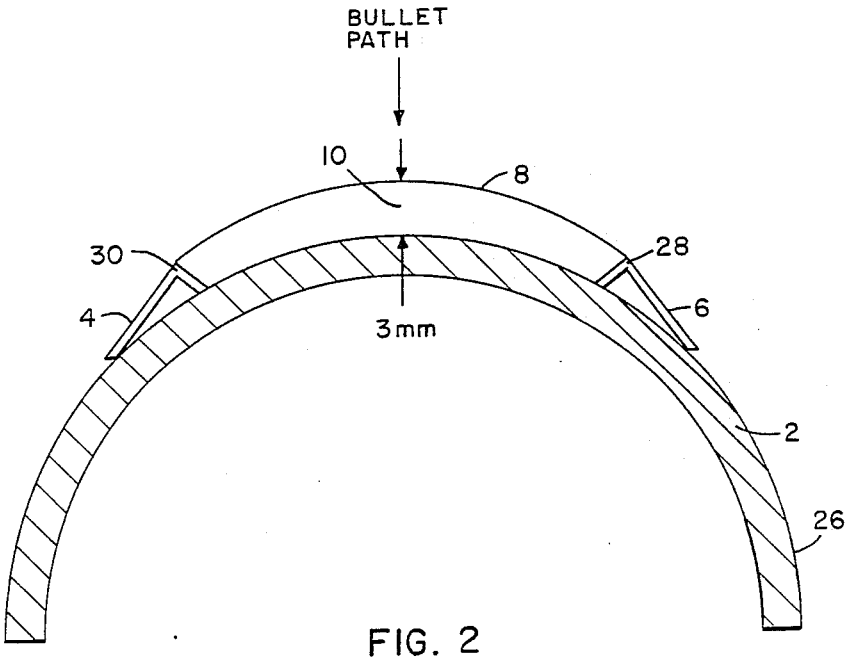
FIG. 2 is a diagram of the top view of the switch assembly for the circuit.

Referring now to the drawings wherein like numbers refer to like parts, FIG. 1 shows the front view of the subject invention. A rectangular foil patch 8 of suitable electrically conductive material such as aluminum foil and cut to dimensions of approximately 2.5×4.5 inches is attached to a pair of rectangular insulators, 4, 6, one insulator at each end (short side) of the foil patch. Each of these insulators, which may be of any nonconducting material such as ordinary paper, is approximately 0.75×3 inches in dimension and folded at one end (short side) so that a crease 28, 30 is formed approximately 0.25 inches from the adjacent edge as shown on FIG. 2. The insulators support the foil patch 8 at the creases and are attached to the motor case surface at the ends. Thus the insulators prevent the foil patch from coming into direct contact with the conductive surface 26 of the grounded motor case 2 prior to bullet strike. Foil patch 8 and insulators 4, 6 are installed on the surface of the motor case so as to leave an air gap 10 of approximately 3 millimeters between the surface of the motor case and the foil patch where the bullet will strike. A nonconducting adhesive may be used to attach the unit of patch and insulators to the motor case surface, as well as attach the foil patch to the insulators.

Figure 3:
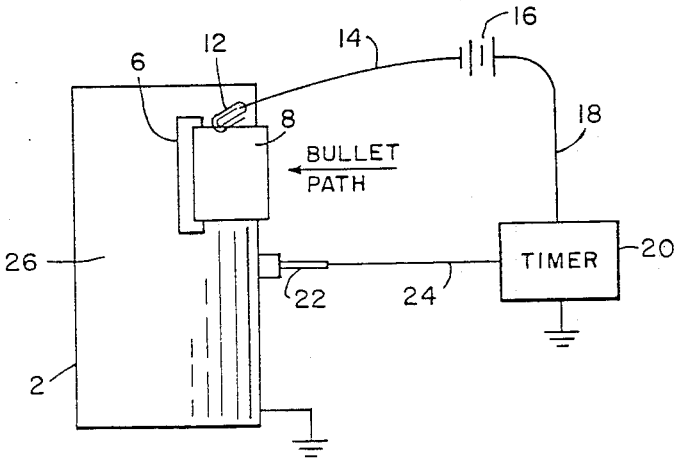
FIG. 3 illustrates the electrical connections of the complete circuit.

FIG. 3 shows in detail the complete electrical connections of the circuit. Foil patch 8 is connected to a low voltage, low direct current power source 16 by a convenient means such as conducting wire clip 12 attached to the top edge of foil patch 8, and by a conducting wire 14 which is soldered to the wire clip. Typically the power source 16 may be a small battery box that contains a "D" size battery. The power source is further connected to timer 20 by conducting wire 18. Wire 14 from the clip must be routed to power source 16 so as to maintain total lack of contact with surface 26 of motor case 2. This lack of contact ensures that the circuit from the foil patch to the timer remains open and no current flows to activate the timer until bullet strike.

However, when the bullet strikes foil patch 8, the patch collapses and comes in contact with surface 26 of motor case 2, thus closing the electrical circuit. Timer 20 senses the voltage now present in its trigger circuit and records the exact time of impact and continues to count. The bullet travels through the motor case and, if there is missile propellant in it, causes the motor to detonate. A time lapse will have occurred between the bullet strike on the foil patch and detonation. When detonation occurs, a data acquisition pin 22, which may be a piezo-electric pin and which is installed to be in direct contact with motor case 2 creates voltage. This voltage, now present in connecting wire 24, stops timer 20. It is thus shown that the timer is activated by the actual impact of the bullet and is stopped by detonation. It is readily seen that the assembly described above can provide reliable and accurate measurements of the time lapse between time of impact and time of detonation. Except for the timer which has a surge protector, all other coponents of the circuit assembly are destroyed during an explosion of a motor case.

The circuit has proven to be reliable and efficient and has, in fact, shown that there is a measurable time lag from the time that bullet impacts a motor case to the time that a conventional sensing device records the impact. The circuit assembly has the additional virtues of being inexpensive, easy to manufacture, maintain and dispose of.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

I claim:

1. A circuit for measuring absolute time lapse between impact and detonation in a bullet test, comprising: a grounded motor case, said motor case having an electrically conductive surface, missile propellant contained within said motor case; a first insulator having a first end, a second end, and a crease adjacent to said first end, said first insulator attached at said ends to said motor surface so as to raise said creases above said surface; a second insulator having a first end, a second end, and a crease adjacent to said first end, said second insulator attached at said ends to said motor surface so as to raise said crease above said surface, said second insulator being spaced apart from said first insulator to provide a region of exposed motor case surface therebetween; an electrically conductive metal foil having two opposing ends, said foil attached at said opposing ends to said creases of said insulators so as to leave an air gap between said region of said motor surface and said foil, said foil further being disposed to receive an impact on its surface and collapse on said motor surface on such impact; a power source; a timer; said foil, power source and timer being coupled in series and connection therebetween being such as to maintain a complete electrical separation between said foil and said motor case surface until impact, said motor case and said timer being coupled to a common ground; a piezo-electric pin attached to said motor case for creating a voltage pulse upon detonation of said motor case, and said pin being electrically coupled to said timer for coupling the pulse thereto, said timer being responsive to said pulse to stop timing.

2. A circuit as set forth in claim 1, wherein, said connection between foil, power source and timer comprises a metallic clip having a first end and a second end, a first conducting wire, and a second conducting wire, said first end of said clip attached to said foil and said second end suitably joined conductably to said first wire, said first wire connecting said clip and said power source, and said second wire connecting said power source and said timer.

3. A circuit as set forth in claim 2, wherein said metal foil is aluminum foil in the shape of a rectangle having dimensions of $2.5 \times 4.5$ inches.

4. A circuit as set forth in claim 3 wherein said insulators are of paper in the shape of rectangles each having dimensions of $0.75 \times 3$ inches.

5. A circuit as set forth in claim 4, wherein said creases of said insulators are approximately 0.25 inch from corresponding first ends of said insulators.

6. A circuit as set forth in claim 5, wherein said air gap is approximately 3 millimeters thick.

* * * * *